United States Patent
Lundquist et al.

(10) Patent No.: US 6,858,299 B2
(45) Date of Patent: Feb. 22, 2005

(54) HIGH SOLIDS PROCESS FOR PREPARING POLYMERIC NANOPARTICLES

(75) Inventors: Eric G. Lundquist, North Wales, PA (US); Wayne Devonport, Doylestown, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 10/840,020

(22) Filed: May 6, 2004

(65) Prior Publication Data

US 2004/0236050 A1 Nov. 25, 2004

Related U.S. Application Data

(60) Provisional application No. 60/471,697, filed on May 19, 2003.

(51) Int. Cl.$^7$ .................................................. B32B 9/00
(52) U.S. Cl. .................. 428/402.21; 428/402; 428/408; 525/332.2; 525/332.9; 525/314; 526/319; 526/317.1; 526/318.44; 526/320; 526/909
(58) Field of Search ................................ 428/402, 407, 428/402.21; 525/332.2, 314, 313, 332.9, 165, 175; 526/319, 317.1, 318.44, 320, 909; 524/501, 495, 496, 513, 514, 528

(56) References Cited

U.S. PATENT DOCUMENTS

| 4,340,511 A | 7/1982 | Backhouse et al. |
|---|---|---|
| 4,403,003 A | 9/1983 | Backhouse |
| 4,539,363 A | 9/1985 | Backhouse |
| 4,777,213 A | 10/1988 | Kanda et al. |
| 4,880,859 A | 11/1989 | Slongo et al. |
| 4,880,889 A | 11/1989 | Jung et al. |
| 4,894,399 A | 1/1990 | Rody et al. |
| 5,021,525 A | 6/1991 | Montague et al. |
| 5,346,958 A | 9/1994 | Yukawa et al. |
| 5,621,058 A | 4/1997 | Kondo et al. |
| 5,650,473 A | 7/1997 | Kimpton et al. |
| 5,681,889 A | 10/1997 | Kondo et al. |
| 5,711,940 A | 1/1998 | Kuentz et al. |
| 5,756,573 A | 5/1998 | Trumbo et al. |
| 5,863,996 A | 1/1999 | Graham |
| 5,962,574 A | 10/1999 | Jackson et al. |
| 5,986,020 A | 11/1999 | Campbell et al. |
| 6,028,135 A | 2/2000 | Keller et al. |
| 6,300,443 B1 | 10/2001 | Solomon et al. |
| 6,368,239 B1 * | 4/2002 | Devonport et al. ......... 106/31.6 |
| 6,372,820 B1 * | 4/2002 | Devonport .................. 523/215 |
| 6,437,050 B1 | 8/2002 | Krom et al. |
| 6,545,095 B1 | 4/2003 | Solomon et al. |
| 6,551,393 B2 * | 4/2003 | Devonport et al. ......... 106/31.6 |
| 6,586,097 B1 | 7/2003 | Pascault et al. |
| 6,646,068 B2 | 11/2003 | Chisholm et al. |
| 2002/0098144 A1 * | 7/2002 | Devonport et al. ...... 423/449.2 |
| 2003/0232914 A1 * | 12/2003 | Devonport et al. ......... 524/501 |
| 2004/0063809 A1 * | 4/2004 | Fu et al. ..................... 523/160 |
| 2004/0063817 A1 * | 4/2004 | Ilenda et al. ................ 523/220 |

FOREIGN PATENT DOCUMENTS

EP 0 021 618 1/1981

* cited by examiner

Primary Examiner—Tatyana Zalukaeva
(74) Attorney, Agent, or Firm—Joanne P. Will; Richard R. Clikeman; Thomas S. Deibert

(57) ABSTRACT

The present invention relates to an emulsion free high solids process for preparing crosslinked polymeric nanoparticles of 1–200 nm in diameter.

10 Claims, No Drawings

HIGH SOLIDS PROCESS FOR PREPARING POLYMERIC NANOPARTICLES

CROSS-REFERENCE TO RELATED APPLICATIONS

This is a Non-Provisional U.S. Patent Application of U.S. Provisional Patent Application No. 60/471,697, filed May 19, 2003.

BACKGROUND OF THE INVENTION

Polymeric nanoparticles have attracted increased attention over the past several years. Compared to conventional compounds, polymeric nanoparticles have improved mechanical strength, greater control of transport properties, material property adjustability, and dimensional stability. Because of these properties, polymeric nanoparticles are useful in a variety of applications such as catalysis, coatings, pharmaceuticals as controlled release devices, biostructural fillers, electronics and polymeric composites.

It is currently believed to successfully produce polymeric nanoparticles, the reactants and final products must be well dispersed within the reaction medium. Processes developed to produce polymeric nanoparticles include, solution polymerizations and dispersion polymerizations. Yet the current solution and dispersion processes can only produce polymeric nanoparticles at low solids levels. Emulsion polymerizations can also be used to produce small particles, generally having a mean particle size of greater than 50 nanometers, at high solids levels, by using dilute conditions and/or high levels of dispersing agents such as surfactants. The use of high levels of surfactants and polymerizable surfactants are well know in the art to be effective means to produce polymeric nanoparticles in aqueous emulsion polymerizations. Unfortunately, however, the use of high levels of surfactants create performance property problems. For example, in coatings applications these problems include decreased water fastness and scrub resistance.

Attempts have been made to solve these problems by avoiding the use of surfactants. Polymer nanoparticles have been produced using surfactant free, dilute, non-aqueous solution processes. For example, in U.S. Pat. No. 5,863,996, a solution polymerization process is disclosed for producing crosslinked polymers having a weight average molecular weight from 5,000 to 20,000,000. The highest percent solids of any process disclosed in this patent for preparing crosslinked polymer sols, isolated before gelation occurred, was 20%.

Further, U.S. patent application Ser. No. 2003/0008989A1 describes attempts to deal with the problem by producing crosslinked polymeric nanoparticles by means of a surfactant free, solution polymerization process. However, experiments conducted at a greater than 25% solids level, resulted in the formation of macrogels and gels with no nanoparticles being obtained.

These processes have eliminated surfactants, but a process for producing polymeric nanoparticles at a high solids level is still lacking. The production of high solids is desirable because of both the saving of time and money, making a high solids process a more viable commercial process. The process of the present invention has solved the problems that the art could not. The process of the present invention produces polymeric nanoparticles at a solids level of equal to or greater than 30% by weight without the problems of gelling or low yield.

The present invention relates to a process for preparing polymeric nanoparticles comprising adding reactants to a vessel and reacting said reactants to form crosslinked polymeric nanoparticles wherein said polymeric nanoparticles have a mean particle diameter of from 1 to 200 nm and wherein the process is emulsion free and wherein the process yields a solids level of polymeric nanoparticles equal to or greater than 30 weight %.

One aspect of the present invention is that the process is emulsion free. The term "emulsion" as used herein means a stable mixture of two or more immiscible liquids held in suspension by a small percentage of substance called emulsifier. All emulsions are comprised of a continuous phase and a disperse phase. For example, in emulsion polymerization, water is the continuous phase, the monomer is the disperse phase and a surfactant is often used as the emulsifier.

The polymeric nanoparticles formed by the process of the present invention can be crosslinked. Crosslinking is accomplished during polymerization by using a multifunctional reactant or by a post reaction in which polymer chains are linked together through functional groups. For example, crosslinkers can be added at levels of 1–100 weight %, as a further example, crosslinkers can be added at levels of 5 to 80 weight % and yet another example, crosslinkers can be added at levels of 10–50 weight %.

Particle size can be determined by measuring mean particle diameter. Besides mean particle diameter the particle diameter distribution can also be measured. Examples of the mean particle diameter of the polymeric nanoparticles formed by the process of the present invention are in the range of 1 to 200 nm, another example is the range of 1 to 100 nm, and yet another example is the range of 1 to 50 nm. Examples of particle diameter distribution are 1 to 200 nm, in another example 2 to 100 nm and in another example 2 to 50 nm. Control of mean particle diameter and particle diameter distribution can be achieved by such methods as choice of solvent, choice of initiator, total solids level, initiator level, type and amount of reactants, and reaction conditions. Techniques to measure mean particle diameter and particle diameter distribution can be determined using techniques including but not limited to, standard dynamic light scattering, small angle neutron scattering NMR diffusion, X-ray scattering and gel phase chromatography.

Gel permeation chromatography (GPC) elution times of the polymeric nanoparticles thereby provide an indication of mean particle diameter. The size of the polymeric nanoparticles can be determined by comparing the polymeric nanoparticles with polystyrene standards with known molecular weights and hydrodynamic radii. The gel permeation chromatography technique used compares elution times of the crosslinked polymer nanoparticles with the elution times of polystyrene standards of known molecular weight and hydrodynamic radius using a column containing 10 micron PL gel.

Further, the process of the present invention may be carried out by adding reactants in a manner such as continuous, staged, timed or pulsed addition. One example of such a feed is pulsed addition where multiple addition of reactants are added to a reaction vessel where each addition is separated by a time interval where no reactant is being fed. The time interval between each addition may be the same or may be different. An example of the time interval separating each addition of an aliquot of reactant may be one second or more, a further example of said time interval may be 1 second to 8 hours, yet another example of said time interval may be 30 seconds to 8 hours. Also, reactants may be added as two or more aliquots. Another example of reactant addition may be the addition of at least three aliquots and yet another example may be four or more aliquots. Although not to be bound by theory, it is believed that by adding the reactants by a pulsed addition process, the polymeric nanoparticles at least partially form in the reaction mixture and are dispersed before the next aliquot is added, thus allowing the solids level to build without macrogel formation.

The total reaction time for the process of the present invention can be, for example, two seconds to 24 hours, as a further example, the total reaction time for the process of the present invention can be 1 hour to 20 hours, and yet another example, the total reaction time for the process of the present invention can be 3 hours to 15 hours.

The polymeric nanoparticles solids level achieved by the practice of the present invention is, for example, equal to or greater than 30 weight %, as further examples the solids level can be greater than or equal to 35 weight %, greater than or equal to 40 weight %, greater than or equal to 45 weight %, greater than or equal to 50 weight %, greater than or equal to 55 weight %, greater than or equal to 60 weight %, and in yet another example, the solids level is greater than or equal to 65 weight %. The weight percent solids can be determined by measuring the solids level of the final polymeric nanoparticles solution produced by the process of the present invention by placing a weighed sample of the final polymeric nanoparticle solution on a solids balance, heating the sample to 160° C. until no further volatiles are evolved and measuring the weight of volatile non solids material that is lost. The lost weight subtracted from the initial weight divided by the initial weight multiplied by 100 will equal the weight % solids level of that polymeric nanoparticle solution produced by the process of the present invention.

In addition, the weight percent solids may be measured using a similar technique after the addition of each aliquot of reactants. For example, the weight percent solids measured after the first addition may be up to 5 weight percent, up to 10 weight percent, up to 15 weight percent, up to 20 weight percent or more. Addition of the second aliquot may increase the weight percent solids up to a total of 10 weight percent, or 15 weight percent, 20 weight percent, 30 weight percent or more. Subsequent aliquots continue to increase the solids level until the final desired solids level is obtained.

An example of the combination of multiple aliquots, pulsed addition and reaction time may be where the first aliquot of reactants is added to a reaction vessel over a 15 minute time period followed by a 30 minute wait time period, followed by a second aliquot addition over a period of 15 minutes, followed by 30 minute wait time period, followed by a third aliquot addition over a 15 minute time period followed by a 30 minute wait time period. This process of adding reactants and waiting continues until the desired solids level of equal to or greater than 30 weight percent crosslinked polymeric nanoparticles is achieved.

Another example of the process of the present invention is as follows: the first aliquot of reactants are added to the reaction vessel over a 60 minute time period followed by a 10 minute wait time period, followed by a second aliquot addition over a period of 30 minutes, followed by 30 minute wait time period, followed by a third aliquot addition over a 15 minute time period followed by a 30 minute wait time period. This process of adding reactants and waiting continues until the desired solids level of equal to or greater than 30 weight percent crosslinked polymeric nanoparticles is achieved.

Yet another example of the process of the present invention is as follows: the first aliquot of reactants are added to the reaction vessel over a 10 minute time period followed by a 30 minute wait time period, followed by a second aliquot addition over a period of 10 minutes, followed by 30 minute wait time period, followed by a third aliquot addition over a 10 minute time period followed by a 30 minute wait time period. This process of adding reactants and waiting continues until the desired solids level of equal to or greater than 30 weight percent crosslinked polymeric nanoparticles is achieved.

During reactant addition, the reaction temperature is typically kept constant, although it is possible to vary the reaction temperature. After completing the reactant mixture addition, additional reactants can be charged to the reaction and/or hold periods can be employed. Exemplary reaction temperature ranges are −30° C. to 150° C., further exemplary ranges are 0–120° C., and yet another exemplary range is 30–90° C.

The process of the present invention can be carried out by solution polymerization, dispersion polymerization, suspension polymerization, and precipitation polymerization.

By "solution polymerization" herein is meant polymerization in a solvent for the polymer. By "solvent for the polymer" herein is meant that linear random (co)-polymers having substantially similar polymerized monomer units to the polymer nanoparticles, are soluble in the solvent. A suitable solvent or mixture of solvents can also be selected using solubility parameter analysis as disclosed herein.

The polymeric nanoparticles produced by the process of the present invention can be prepared in aqueous and non-aqueous solvent systems and combinations thereof Non-limiting solvent examples include: hydrocarbons, such as alkanes, halohydrocarbons, such as chlorinated, fluorinated, and brominated hydrocarbons, aromatic hydrocarbons, ethers, ketones, esters, water, alcohols and mixtures thereof. Particularly suitable solvents include dodecane, decane, mesitylene, xylenes, diphenyl ether, gamma-butyrolactone, ethyl acetate, ethyl lactate, propyleneglycol monomethyl ether acetate, caprolactone, 2-heptanone, methylisobutyl ketone, diisobutylketone, propyleneglycol monomethyl ether, and alkyl-alcohols, such as decanol, t-butanol, and isopropanol ("IPA").

The polymeric nanoparticles produced by the present invention can be prepared by dispersion polymerization. By "dispersion polymerization" herein is meant polymerization in a solvent such that the polymer produced is insoluble, but maintained as a homogeneous phase by electrostatic or steric stabilization.

The polymeric nanoparticles produced by the present invention can be prepared by suspension polymerization. By "suspension polymerization" herein is meant polymerization in a solvent such that the polymer produced is insoluble, but maintained as a stable two phase system by electrostatic or steric stabilization.

The polymeric nanoparticles produced by the present invention can be prepared by precipitation polymerization. By "precipitation polymerization" herein is meant polymerization in a solvent such that the polymer produced is insoluble.

The polymeric nanoparticles prepared by the process of the present invention can be prepared using any reactive materials including for example monomers, crosslinkable polymers or crosslinking polymers.

Reactants useful in the practice of the present invention can be organic materials such as monomers of alkyl (meth) acrylates, alicyclic (meth)acrylates, (meth)acrylamides, vinyl acetates, alkenyl (meth)acrylates, aryl (meth)acrylates, alkylaryl (meth)acrylates, amine containing (meth)acrylates, phosphorous containing (meth)acrylates, sulfur containing (meth)acrylates, vinyl aromatic monomers, (meth)acrylic acid, and substituted ethylene monomers. Exemplary alkyl (meth)acrylates are useful in making polymeric nanoparticles, for example, methyl methacrylate ("MMA"), methyl acrylate, ethyl acrylate, propyl methacrylate, butyl methacrylate ("BMA"), butyl acrylate ("BA"), IBMA, hexyl methacrylate, cyclohexyl methacrylate, cyclohexyl acrylate, 2-ethylhexyl acrylate ("EHA"), 2-ethylhexyl methacrylate, octyl methacrylate, decyl methacrylate, isodecyl methacrylate, undecyl methacrylate, dodecyl methacrylate, tridecyl methacrylate, tetradecyl methacrylate, pentadecyl methacrylate, hexadecyl methacrylate, heptadecyl methacrylate, octadecyl methacrylate, nonadecyl methacrylate, cosyl methacrylate, eicosyl methacrylate, and mixtures thereof.

Useful substituted alkyl (meth)acrylate monomers for making polymeric nanoparticles containing acid functional monomers may include those with one or more hydroxyl groups in the alkyl radical, such as hydroxyalkyl (meth) acrylate monomers having a substituted alkyl group selected from the group consisting of ($C_2$–$C_6$)alkyl, branched and unbranched alkyl groups. Likewise, where hydroxyl group containing monomers or monomers containing acetoacetoxy groups are used to make polymeric nanoparticles, acid functional monomers can be added to react with those groups. Examples of these monomers are hydroxylalkyl (meth)acrylate 2-hydroxyethyl methacrylate ("HEMA"), 2-hydroxyethyl acrylate ("HEA"), 2-hydroxypropyl methacrylate and acetoacetoxy methacrylate. Useful amine containing (meth)acrylates include aminoethylmethacrylate and dimethylaminoethylmethyacrylates. Useful sulfur containing monomers include 2-Acrylamido-2-methyl-1-propanesulfonic acid, vinyl sulfonic acid and styrenesulfonic acid.

Useful phosphorous containing monomers include vinyl phosphonic acid and methacrylic ethyl phosphonates.

Other substituted (meth)acrylate monomers useful in the present invention may include silicon-containing monomers such as γ-propyl tri($C_1$–$C_6$) alkoxysilyl (meth)acrylate, γ-propyl tri($C_1$–$C_6$) alkylsilyl (meth)acrylate, γ-propyl di($C_1$–$C_6$) alkoxy ($C_1$–$C_6$)alkylsilyl (meth)acrylate, γ-propyl di($C_1$–$C_6$)alkyl($C_1$–$C_6$)alkoxysilyl (meth)acrylate, vinyl tri ($C_1$–$C_6$)alkoxysilyl (meth)acrylate, vinyl di($C_1$–$C_6$)alkoxy ($C_1$–$C_6$)alkylsilyl (meth)acrylate, vinyl ($C_1$–$C_6$) alkoxydi ($C_1$–$C_6$)alkylsilyl (meth)acrylate, vinyl tri($C_1$–$C_6$)alkylsilyl (meth)acrylate, and mixtures thereof. Vinylaromatic monomers useful as unsaturated monomers in the present invention may include styrene ("STY"), α-methylstyrene, vinyltoluene, p-methylstyrene, ethylvinylbenzene, vinylnaphthalene, vinyl pyridine vinylxylenes, and mixtures thereof.

Exemplary ethylenic and substituted ethylene monomers useful as unsaturated monomers in the present invention may include cyclopent(adi)ene, allylic monomers, vinyl pyrrolidone, vinyl acetate, vinyl formamide, vinyl chloride, vinyl fluoride, vinyl bromide, vinylidene chloride, vinylidene fluoride and vinylidene bromide.

Exemplary non-ethylenically unsaturated reactants useful as monomers in the present invention may include multifunctional reactants capable of combining to form a polymer by an addition or condensation reaction. Useful monomers include, but are not limited to: alcohols, acids, amines, halides, acid halides, isocyanates, anhydrides, esters, amides, alcoxysilanes, etc. Appropriate non-limiting reactive combinations are known to those skilled in that art, but include examples such as an alcohol reacting with an isocyanate (such as diisocyanatohexane reacting with hexane-1,6-diol), an acid reacting with an alcohol (such as adipic acid reacting with hexane-1,6-diol), an anhydride reacting with an amine (such as ethylene diamine reacting with ethylenediaminetetraacetic acid anhydride), and halide reacting with an alcohol (such as diiodoethane reacting with resocinol).

Further, degradable organic materials may be used as reactants in the process of the present invention. Degradable organic materials may be selected from the group comprising of chemical groups that may be degraded by the action of light, heat, water, enzymes, and electromagnetic radiation. Examples of said chemical groups include, but are not limited to: disulfides, hydroxyalkanoates, sacharides, peptides, azo, peroxide, vinyl, activated carbonates, activated esters and amides.

Additionally, crosslinkers may be used as reactants in the process of the present invention. Crosslinkers include, but not limited to: di-, tri-, tetra-, or higher multi-functional ethylenically unsaturated monomers such as ethyleneglycol diacrylate, trimethylolpropane triacrylate, allyl methacrylate (ALMA), ethyleneglycol dimethacrylate (EGDMA), DEGDMA, propyleneglycol dimethacrylate, propyleneglycol diacrylate, TMPTMA, 2,2-dimethylpropane-1,3-diacrylate, 1,3-butylene glycol diacrylate, 1,3-butylene glycol dimethacrylate, 1,4-butanediol diacrylate, diethylene glycol diacrylate, diethylene glycol dimethacrylate, 1,6-hexanediol diacrylate, 1-6-hexanediol dimethacrylate, tripropylene glycol diacrylate, triethylene glycol dimethacrylate, tetraethylene glycol diacrylate, polyethylene glycol 200 diacrylate, tetraethylene glycol dimethacrylate, polyethylene glycol dimethacrylate, ethoxylated bisphenol A diacrylate, ethoxylated bisphenol A dimethacrylate, polyethylene glycol 600 dimethacrylate, poly(butanediol) diacrylate, pentaerythritol triacrylate, trimethylolpropane triethoxy triacrylate, glyceryl propoxy triacrylate, pentaerythritol tetraacrylate (PETTA), pentaerythritol tetramethacrylate (PETMA), and mixtures thereof. Other crosslinkers useful in the present invention may include DVB, vinyl urethanes, diallyl ethers, diallyl esters, vinyl polyesters, trivinylbenzene, divinyltoluene, divinylpyridine, divinylnaphthalene and divinylxylene, diethyleneglycol divinyl ether, and trivinylcyclohexane, dibromoethane, diethylene glycol, polyethyelene glycol, 1,2-diaminoethane, malonic acid, bismaleamide, triacrylicisocyanurate, triallylisocyanurate, diallyloxyacetic acid, toluene diisocyanate, limonene, urea, dibromobutane,.

For use in high-temperature resistant applications with silicon-containing resins, crosslinkers may preferably comprise silyl group-containing monomers such as divinyl silane, trivinyl silane, dimethyl divinyl silane, divinyl methyl silane, methyl trivinyl silane, diphenyl divinyl silane, divinyl phenyl silane, siloxane-containing monomers such as dimethyl vinyl disiloxane, poly(methyl vinyl siloxane, poly (vinyl hydrosiloxane), poly(phenyl vinyl siloxane) and mixtures.

Additionally, functional polymers and oligomers may be used as crosslinkers or crosslinkable polymers. Suitable functional polymers for use as crosslinkers in the present invention include, but are not limited to, acrylate and styrene functional homo- and co-polymers derived from the reaction of an appropriately functional vinyl monomer with a polymer comprising of, but not limited to, poly alcohols, such as poly(ethylene glycol), poly(proylene glycol), hydrolyzed and partially hydrolyzed poly(vinyl alcohol); poly (siloxane), such as poly(dimethylsiloxane); poly(hydroxyethyl acrylate); poly(hydroxypropyl acrylate); poly(hydroxy styrene); degradable polymers such as starch; saccharides such as glucose, dextrose, fructose, dextran, cyclodextrin, cellulose, chitin, chitosan. Other polymers suitable for use as crosslinkers include, but are not limited to, functional polymers such as: poly(allylamine); polyacrylic acid; poly(acryloyl chloride); polyalanine; poly(aminostyrene); polyaniline; poly(bromostyrene); polybutadiene; polyamides and polyesters such as polyhydroxyalkanoates; polycaprolactone, polycaprolactone diol, polyethyleneterephthalate, nylon-6,6; polyethyleneimine; poly(furfuryl alcohol); poly(glycolide); poly(lactide); polylactic acid; poly(itaconic acid); poly(maleic acid); poly(maleic anhydride); poly(vinylamine); poly(vinyl chloride); hydroxy, carboxylic acid, halogen, and amino functional dendrimers or hyperbranched polymers such as poly(amidoamines); poly(benzylethers), poly(alkylimines). The aforementioned crosslinkers have a molecular weight less than or equal to 10,000 Daltons.

One skilled in the art understands that the process of the present invention may be carried out by techniques such as free radical, anionic, cationic, metal catalyzed and condensation polymerization mechanisms and coupling crosslinking reactions.

When the reaction mechanism is free radical polymerization, initiators useful in the practice of the present invention include, for example, one or more of: peroxyesters, dialkylperoxides, alkylhydroperoxides, persulfates, azoinitiators, redox initiators and the like. Useful free radical initiators include, but are not limited to: benzoyl peroxide, t-butyl peroctoate, t-amyl peroxypivalate, cumene hydroperoxide, and azo compounds such as azoisobutylnitrile and 2,2'-azobis (2-methylbutanenitrile). The amount of the free radical initiator used is typically from 0.05 to 10% by weight, based on the weight of total monomer. Chain transfer reagents can optionally be used in the process of the present invention to prepare the polymeric nanoparticles. Suitable chain transfer agents include, for example: alkyl mercaptans such as dodecyl mercaptan, phosphorous acids, aromatic hydrocarbons with activated hydrogens such as toluene, and alkyl halides such as bromotrichloromethane and alcohols such as isopropanol.

When the reaction mechanism is anionic polymerization, initiators useful in the practice of the present invention include, for example, one or more of strong anions such as, organo-lithiums, organo-sodiums, organo-potassiums, Grignard reagents and the like. Useful anionic initiators include, but are not limited to: butyl lithium, sodium naphthalide, liquid ammonia, potassium amide, potassium t-butoxide, potassium metal, amyl sodium. An exemplary anionic initiator is butyl lithium. The amount of the anionic initiator used is typically from 0.05 to 10% by weight, based on the weight of total monomer.

When the reaction mechanism is cationic polymerization, initiators useful in the practice of the present invention include, for example, one or more of protonic acids, Lewis acids, and/or compounds capable of generating cations, or ionizing radiation. Useful cationic initiators include, but are not limited to: hydrochloric acid, methanesulfonic acid, boron triflouride, aluminum trichloride, tin chloride, tin bromide, antimony chloride, titanium (IV) chloride, zirconium dichloride, zirconium tetrachloride, iodine. An exemplary cationic initiator is aluminum trichloride. The amount of the cationic initiator used is typically from 0.05 to 10% by weight, based on the weight of total monomer.

When the reaction mechanism is a metal catalyzed polymerization, such as metathesis, ring opening polymerization, Ziegler-Natta, and atom transfer radical polymerization. Initiators useful in the practice of the present invention include, but are not limited to complexes of transition metal halides, and the like. Useful metal catalyzed polymerization initiators include, but are not limited to: bis(tricyclohexylphosphene)benzylidine ruthenium (IV) dichloride, 2,6-diisopropylphenylimidonephylidene [(S)-BIPHEN]molybdenum (VI) (Schrock-Hoveyda catalyst), 2,6-diisopropylphenylimidonephylidene molybdenum (VI) bis(t-butoxide), 2,6-diisopropylphenylimidonephylidene molybdenum (VI) bis(hexafluoro-t-butoxide (Schrock Catalyst). The amount of the free radical initiator used is typically from 0.05 to 10% by weight, based on the weight of total monomer.

When the reaction mechanism is condensation polymerization, catalysts useful in the practice of the present invention may include, for example, but are not limited to one or more of the following: acids such as hydrochloric acid, p-toluenesulfonic acid, methylenesulfonic acid, camphorsulfonic acid and the like; bases such as metal alkoxides such as sodium methoxide and potassium methoxide and the like; metal acetate salts such as cadmium acetate, zinc acetate, lead acetate, cobalt acetate, barium acetate, magnesium acetate; alkali metals such as sodium and potassium. The amount of the catalyst used is typically from 0.05 to 10% by weight, based on the weight of total monomer.

Additionally, inorganic nanoparticles, and inorganic precursors may be used as reactants to form high solids polymer nanoparticle composites.

Inorganic nanoparticles useful in the practice of the present invention include, but are not limited to, clays (both synthetic and natural), silica (colloidal, fumed, amorphous,), silica sols, titanium dioxide, metals (alumina and zirconia), metal oxides (e.g. cesium oxide, alumina oxide, yttrium oxide, antimony oxide), metal nitrides, inorganic pigments, metal carbides, metal sulfides, metal silicates, metal borides, metal carbonates, zeolites and carbon nanotubes. The mean particle diameter of the inorganic particles is for example, between 1 and 1000 nm, as a further example, between 1 and 100 and yet another example, between 2 and 50 nm.

Inorganic precursors useful in the practice of the present invention include, but are not limited to: organosilanes, organic zirconates, organotitanates, metal alkoxides, metal diketonates and metal carboxylates.

The polymeric nanoparticles of the present invention may also be prepared by precipitation polymerization. By "precipitation polymerization" herein is meant polymerization in a solvent such that the polymer produced is insoluble.

A general scheme for preparing the polymeric nanoparticles by the process of the present invention is as follows:

The polymeric nanoparticles can be prepared by first charging a solvent heel or, alternatively, a mixture of solvent and some portion of the reactants to a reaction vessel equipped with a stirrer, a thermometer and a reflux condenser. The reactant charge is typically composed of monomer(s), initiator(s), polymers and other reactants, as appropriate. Other reactants may optionally be charged separately from other reactants. The solvent or solvent/reactant heel charge is brought to the appropriate reaction temperature with stirring under a nitrogen blanket. Typical reaction temperatures are in the range of from −30° C. to about 150° C., although lower or higher temperatures are possible. After the heel charge has reached a temperature sufficient to initiate reaction, the reactant charge or balance of the reactant charge is added to the reaction vessel. The total reactant addition time period is typically in the range of from 15 minutes to 8 hours, although both shorter and longer time periods are practicably envisioned.

EXAMPLES

The following examples are intended to illustrate the invention and not to limit it, except as it is limited in the claims. All ratios, percentages and proportions are by weight unless otherwise specified and all reagents used are of good commercial quality unless otherwise specified. Particle size measurements were determined by dynamic light scattering techniques using a Malvern HPPS or by a gel permeation chromatography

Example 1
Batch Reactor Formation of BA/MMA/AA/TMPTA Crosslinked Polymer Nanoparticle A 1000 mL reactor was fitted with a thermocouple, a temperature controller, a purge gas inlet, a water-cooled reflux condenser with purge gas outlet, a stirrer, and an addition funnel. To the addition funnel was charged 36.4 g of a monomer mixture consisting of 12.25 g butyl acrylate, 7 g of acrylic acid, 12.25 g methyl methacrylate, 3.5 g trimethylol propanetriacrylate, 1.4 g of a 75% solution of t-amyl peroxypivalate in mineral spirits. The reactor, containing 400 g 2-propanol (IPA) was then flushed with nitrogen for 30 minutes before applying heat to bring the contents of the reactor to 80° C. When the contents of the reactor reached 80° C., the monomer mixture in the addition funnel was charged to the reactor and held at temperature for 90 minutes. A second aliquot of monomer mixture as described above was added to the reactor, followed by an additional hold period of 90 minutes. This pulsed addition was repeated a further four times. Ninety minutes after the end of the last monomer mixture addition, a chaser shot consisting of 2 g of a 75% solution of t-amyl peroxypivalate in mineral spirits was added. At the end of the chaser aliquot, the contents of the reactor were held for 4 hours at 80° C. to complete the reaction. The reaction was measured to have a solids content of 35%. The mean particle diameter in acetone was determined by dynamic light scattering to be 4 nm with a particle diameter distribution of between 2 and 20 nm.

Example 2
Batch Reactor Formation of BA/MMA/TMPTA Crosslinked Nanoparticle

A 2000 mL reactor was fitted with a thermocouple, a temperature controller, a purge gas inlet, a water-cooled reflux condenser with purge gas outlet, a stirrer, and an addition funnel. To the addition funnel was charged 86 g of a monomer mixture consisting of 30 g butyl acrylate, 30 g methyl methacrylate, 6.7 g trimethylol propanetriacrylate, 2.7 g of a 75% solution of t-amyl peroxypivalate in mineral spirits, and 16.7 g 2-propanol ("IPA"). The reactor, containing 400 g IPA was then flushed with nitrogen for 30 minutes before applying heat to bring the contents of the reactor to 79° C. When the contents of the reactor reached 79° C., the monomer mixture in the addition funnel was charged to the reactor and held at temperature for 90 minutes. A second aliquot of monomer mixture as described above was added to the reactor, followed by an additional hold period of 90 minutes. This pulsed addition process was repeated a further four times. Sixty minutes after the end of the monomer mixture addition, a chaser charge consisting of 8.0 g of a 75% solution of t-amyl peroxypivalate in mineral spirits was added. At the end of the second chaser aliquot, the contents of the reactor were held 30 minutes at 80° C. to complete the reaction. The reaction was measured to have a solids content of 47%. The mean particle diameter in tetrahydrofuran was determined to be 26 nm by gel permeation chromatography.

Prophetic Example 3
Semi-continuous Reactor Formation of BA/MMA/TMPTA Crosslinked Nanoparticle A chain of three reactors is assembled in series. Reactor A is replenished with monomer mixture from a transfer funnel and recycled solvent from Reactor C after each 30 minute period. Reactor B is a heated holding tank. Reactor C is a solvent stripping tank under vacuum.

Reactor A is a 1000 mL reactor is fitted with a thermocouple, connected to a temperature controller, a purge gas inlet, a water-cooled reflux condenser with purge gas outlet, a stirrer, an addition funnel and a transfer line from reactor A and to reactor B. To the addition funnel of Reactor A is charged 86 g of a monomer mixture consisting of 30 g butyl acrylate, 30 g methyl methacrylate, 6.7 g trimethylol propanetriacrylate, 2.7 g of a 75% solution of t-amyl peroxypivalate in mineral spirits, and 16.7 g 2-propanol ("IPA"). Reactor B is a 1000 mL reactor is fitted with a thermocouple, connected to a temperature controller, a purge gas inlet, a water-cooled reflux condenser with purge gas outlet, a stirrer, and a transfer line from Reactor A and to Reactor C. Reactor C is a 1000 mL reactor fitted with a thermocouple, connected to a temperature controller, a water-cooled reflux condenser with distillate collection, and a stirrer.

Reactor A, containing 400 g of oxygen free IPA is heated to 79° C. before addition of the monomer mixture from the addition funnel. Reactor A is held at temperature for 30 minutes before the mixture is pumped to Reactor B. A second batch charge of monomer mixture and solvent as described above is added to Reactor A to restart the reaction cycle. The contents of Reactor B are held at temperature for a period of 30 minutes before the reactor contents are pumped to Reactor C. The contents of Reactor A are transferred to Reactor B. The solvent from the contents of Reactor C is removed in vacuo and transferred into Reactor A. affording dry polymer solid in Reactor C which is collected before transfer of the contents of Reactor B into the newly vacated Reactor C. This process can be operated continuously.

Prophetic Example 4
Formation of BA/MMA/TMPTA Crosslinked Nanoparticles by Precipitation Polymerization A 2000 mL reactor is fitted with a thermocouple, a temperature controller, a purge gas inlet, a water-cooled reflux condenser with purge gas outlet, a stirrer, and an addition funnel. To the addition funnel is charged 86 g of a monomer mixture consisting of 30 g butyl acrylate, 30 g methyl methacrylate, 6.7 g trimethylol propanetriacrylate, 2.7 g of a 75% solution of t-amyl peroxypivalate in mineral spirits, and 16.7 g n-decane. The reactor, containing 400 g n-decane is then flushed with nitrogen for 30 minutes before applying heat to bring the contents of the reactor to 79° C. When the contents of the reactor reach 79° C., the monomer mixture in the addition funnel is charged to the reactor and held at temperature for 90 minutes. A second aliquot of monomer mixture as described above is added to the reactor, followed by an additional hold period of 90 minutes. This pulsed addition process is repeated a further four times. Sixty minutes after the end of the monomer mixture addition, the first of two chaser aliquots, spaced thirty minutes apart and consisting of 8.0 g of a 75% solution of t-amyl peroxypivalate in mineral spirit are added. At the end of the second chaser aliquot, the contents of the reactor are held 30 minutes at 80° C. to complete the reaction. The final solids level is 45%.

Prophetic Example 5
Formation of Glucose Nanoparticles by Solution Polymerization Acrylic acid (10 g, 1 eq), hydroquinone (500 ppm) and dicycohexycarbodiimide (32 g, 1.1 eq.) is added to glucose (100 g) in hot dimethylformamide (34 g). The mixture is stirred at 60 C for 8 h. The solution is filtered and cooled before the addition of 4,4'-azobis(4-cyanovaleric acid) (2 g) and sodium hydroxide (0.5 g) to the supernatant and the batch split into 6 equal aliquots.

A 500 mL reactor is fitted with a thermocouple, a temperature controller, a purge gas inlet, a water-cooled reflux condenser with purge gas outlet, a stirrer, and an addition funnel. To the addition funnel is charged an aliquot of the above macromonomer mixture. The reactor, containing 150 g deionized water is flushed with nitrogen for 30 minutes before applying heat to bring the contents of the reactor to 90° C. When the contents of the reactor reach 90° C., the macromonomer mixture in the addition funnel is charged to the reactor and held at temperature for 90 minutes. A second aliquot of monomer mixture as described above is added to the reactor, followed by an additional hold period of 90 minutes. This pulsed addition process is repeated a further four times. At the end of the monomer charge sequence, the contents of the reactor are held 60 minutes at 90° C. to complete the reaction. The final solids level is 44%.

Prophetic Example 6
Formation of Crosslinked Dimethicone (Polymethylsiloxane 530) Nanoparticles by Solution Polymerization Acrylic acid (27 g, 2 eq), hydroquinone (500 ppm) and methane sulfonic acid (3.6 g, 0.2 eq.) is added to dimethacone (100 g) in toluene (34 g). The mixture is refluxed in a Dean-Stark apparatus until all water evolution as ceased. Upon cooling, t-amyl peroxypivalate (2 g) is added and the batch split into 6 equal aliquots. A 500 mL reactor is fitted with a thermocouple, a temperature controller, a purge gas inlet, a water-cooled reflux condenser with purge gas outlet, a stirrer, and an addition funnel. To the addition funnel is charged an aliquot of the above macromonomer mixture. The reactor, containing 150 g toluene is then flushed with nitrogen for 30 minutes before applying heat to bring the contents of the reactor to 79° C. When the contents of the reactor reach 79° C., the macromonomer mixture in the addition funnel is charged to the reactor and held at temperature for 90 minutes. A second aliquot of monomer mixture as described above is added to the reactor, followed by an additional hold period of 90 minutes. This pulsed addition process is repeated a further four times. Sixty minutes after the end of the monomer mixture addition, the first of two chaser aliquots, spaced thirty minutes apart and consisting of 8.0 g of a 75% solution of t-amyl peroxypivalate in mineral spirits and 20 g toluene, is added. At the end of the second chaser aliquot, the contents of the reactor are held 60 minutes at 80° C. to complete the reaction. The final solids level is 40%.

Prophetic Example 7
Formation of BA/MMA/AA/TMPTA Polymeric Nanoparticles by Solution Polymerization in the Presence of Montmorillonite A 1000 mL reactor is fitted with a thermocouple, a temperature controller, a purge gas inlet, a water-cooled reflux condenser with purge gas outlet, a stirrer, and an addition funnel. To the addition funnel is charged 36.4 g of a monomer mixture consisting of 12.25 g butyl acrylate, 7 g of acrylic acid, 12.25 g methyl methacrylate, 3.5 g trimethylol propanetriacrylate, 1.4 g of a 75% solution of t-amyl peroxypivalate in mineral spirits. The reactor, containing 400 g IPA and 1 g montmorillonite is flushed with nitrogen for 30 minutes before applying heat to bring the contents of the reactor to 80° C. When the contents of the reactor reaches 80° C., the monomer mixture in the addition funnel is charged to the reactor and held at temperature for 90 minutes. A second aliquot of monomer mixture as described above is added to the reactor, followed by an additional hold period of 90 minutes. This pulsed addition process is repeated a further four times. Ninety minutes after the end of the last monomer mixture addition, a chaser shot consisting of 2 g of a 75% solution of t-amyl peroxypivalate in mineral spirits is added. At the end of the chaser aliquot, the contents of the reactor are held for 4 hours at 80° C. to complete the reaction. The final solids level is 34%.

Prophetic Example 8
Formation of a Crosslinked Polystyrene-polyvinyl Pyridine Copolymer by a Crosslinking Reaction A 250 mL reactor is fitted with a thermocouple, a temperature controller, a purge gas inlet, a water-cooled reflux condenser with purge gas outlet, a stirrer, and an addition funnel. To the addition funnel is charged a reaction mixture of 5 grams of the polystyrene-co-polyvinylpyridine copolymer and 1 gram of 1,4-dibromobutane in 5 g of dioxane. The reactor, containing 50 g dioxane is then flushed with nitrogen for 30 minutes before applying heat to bring the contents of the reactor to 90° C. When the contents of the reactor reach 90° C., the reaction mixture in the addition funnel is charged to the reactor and held at temperature for 90 minutes. A second aliquot of reaction mixture as described above is added to the reactor, followed by an additional hold period of 90 minutes. This pulsed addition process is repeated a further six times. At the end of the final aliquot, the contents of the reactor are held for 3 hours at 90° C. to complete the reaction. The final solids level is 35%.

What is claimed is:

1. A process for preparing polymeric nanoparticles comprising adding a solvent and reactants to a vessel and reacting said reactants to form crosslinked polymeric nanoparticles; wherein the reactants comprise monomers selected from alkyl (meth)acrylates, alicyclic (meth)acrylates, (meth) acrylamides, vinyl acetates, alkenyl (meth)acrylates, aryl (meth)acrylates, alkylaryl (meth)acrylates, amine containing (meth)acrylates, phosphorous containing (meth)acrylates, sulfur containing (meth)acrylates, vinyl aromatic monomers, (meth)acrylic acid, substituted ethylene monomers and combinations thereof; wherein the reactants also comprise a crosslinker; wherein said polymeric nanoparticles have a mean particle diameter of from 1 to 50 nm wherein the process is emulsion free and wherein the process yields a solids level of polymeric nanoparticles equal to or greater than 45 weight %.

2. The process according to claim 1 wherein the process is selected from the group consisting of a batch process, a semi continuous process, and a continuous process.

3. The process according to claim 1 wherein the process is selected from the group consisting of solution polymerization, dispersion polymerization, suspension polymerization, and precipitation polymerization.

4. The process according to claim 1 wherein the reactants are added to the vessel in at least two aliquots.

5. The process according to claim 1 wherein the reactants further comprise functional polymers comprising reactive groups.

6. The process according to claim 1 wherein the reactants further comprise inorganic materials.

7. The process according to claim 1 wherein prior to completion of the adding of the reactants there is a time interval where no reactant is being fed.

8. The process according to claim 7 wherein the time interval is 30 seconds to 8 hours.

9. The process according to claim 1, wherein the reaction temperature is between −30° C. and 150° C.

10. The process according to claim 1, wherein the process is selected from a solution polymerization, dispersion polymerization, suspension polymerization and a precipitation polymerization.

* * * * *